(12) United States Patent
Leppanen et al.

(10) Patent No.: US 7,461,401 B2
(45) Date of Patent: Dec. 2, 2008

(54) HANDLING RELATED CONNECTIONS IN A FIREWALL

(75) Inventors: Matti Leppanen, Lieto (FI); Riku Salminen, Turku (FI); Henri Sara, Valbonne (FR); Tuomo Syvanne, Vantaa (FI)

(73) Assignee: Stonesoft Corporation, Helsinki (FI)

( * ) Notice: Subject to any disclaimer, the term of this patent is extended or adjusted under 35 U.S.C. 154(b) by 568 days.

(21) Appl. No.: 10/429,977

(22) Filed: May 6, 2003

(65) Prior Publication Data

US 2004/0054927 A1    Mar. 18, 2004

(30) Foreign Application Priority Data

May 8, 2002    (FI) ................... 20020882

(51) Int. Cl.
H04L 29/04    (2006.01)
H04L 9/00    (2006.01)

(52) U.S. Cl. ............. 726/11; 726/2; 726/3; 709/223; 709/224; 709/225; 709/226

(58) Field of Classification Search .......... None
See application file for complete search history.

(56) References Cited

U.S. PATENT DOCUMENTS 6,141,755 A    10/2000    Dowd et al.
6,219,706 B1    4/2001    Fan et al.

FOREIGN PATENT DOCUMENTS

EP    1 168 749    1/2002
WO    WO 00/60826    10/2000

OTHER PUBLICATIONS

Unknown author, "SafeTP Windows Client—Frequently Asked Questions (FAQ)", published Aug. 4, 2001, printed on Feb. 12, 2008 from http://web.archive.org/web/20010804084111/http://safetp.cs.berkeley.edu/FAQ.html.*

* cited by examiner

*Primary Examiner*—KimYen Vu
*Assistant Examiner*—Ponnoreay Pich
(74) *Attorney, Agent, or Firm*—Barnes & Thornburg LLP

(57) ABSTRACT

The invention concerns handling in a firewall data communication protocols comprising at least one parent connection and at least one related connection, wherein at least one attribute of the related connection is negotiated within the parent connection. Whether to allow a related connection is decided on the basis of information about the related connection as well as information about the parent connection. The method of the invention comprises allowing a parent connection, storing information about the parent connection, monitoring contents of the parent connection, detecting within the parent connection negotiation of at least one attribute of a related connection, and using said at least one negotiated attribute of the related connection and said information about the parent connection for deciding, whether said related connection is allowable.

10 Claims, 4 Drawing Sheets

HANDLING RELATED CONNECTIONS IN A FIREWALL

BACKGROUND OF THE INVENTION

1. Field of the Invention

The present invention relates to network security and, more particularly, to firewalls and to handling related connections in firewalls.

2. Description of the Related Art

Traditionally, a firewall is considered as a set of components forming a gateway between two or more networks, which have different security requirements. Thus, a firewall is a gateway which operates at the same time as a connector and a separator between the networks in a sense that the firewall keeps track of the traffic that passes through it from one network to another and restricts connections and packets that are defined as unwanted by the administrator of the system. Physically a firewall is a device with appropriate software to do the tasks assigned to it. It can be a router, a personal computer (PC), or whatever device that can be used for such purposes.

A firewall is configured by means of rules (forming a rule base), which define which data packets are allowed to traverse the firewall and which are not. A rule comprises information for identifying a data packet (e.g. source and destination addresses and ports) and an associated action, which may be for example to allow or deny the packet. Usually everything that is not explicitly allowed in the rules is denied. The action may be also something else than simply allow or deny. For example, the action defined in the rule may indicate that some further action needs to be taken before releasing a data packet, which is in principle allowed. Such further processing may be for example network address translation (NAT), encryption, decryption or virus checking. Also deny action may include further processing. For the sake of simplicity, mainly only the actions deny and allow are discussed herein, however, the possibility to have further processing associates with these actions is not excluded.

A firewall may be a simple packet filter, which compares header fields of a data packet to the rule base and processes the data packet according to the rule, which matches the data packet. A more advanced, stateful firewall keeps track also on the state of different connections. The principle in a such firewall is the following: when a data packet, which is opening a new connection, arrives at the firewall, it is checked on the basis of the rule base, whether the connection should to be allowed or denied. If the connection is allowed, an entry is added to a table of open connections (connection state table), and otherwise the data packet is simply discarded. A data packet, which is not opening a new connection, is compared to the connection state table instead of the rule base. If the corresponding connection exists in the table the data packet is allowed and otherwise denied. Further, the state of the connection may be maintained in the corresponding entry of the connection state table. In this way only data packets belonging to valid open connections are allowed to traverse the firewall.

Some data transfer protocols consist of more than one separate connection. For example, a first connection is opened and then at least one other connection is opened on the basis of information obtained from or transferred within the first connection (see e.g. U.S. Pat. No. 6,219,706). That is, some attributes of the other connection are negotiated within the first connection. These are herein referred to as a parent connection (the first connection) and a related connection (the other connection). Such a related connection is always related to some parent connection and does not exist alone in a sense that opening the related connection requires intervention of the parent connection. However, the parent connection may be terminated before terminating the related connection. In addition, one related connection may be a parent connection of another related connection. This concerns for example H.323 protocol. For these protocols the method of allowing connections described above needs to be further adjusted, since the details of the related connection may not be known beforehand.

For example in FTP (File Transfer Protocol) the opening and attributes of a data connection between a server and a client are negotiated in a separate control connection. (That is, the data connection is a related connection and the control connection is a parent connection.) In order for the FTP to work through a stateful firewall, an entry corresponding to the data connection needs to be stored in the firewall (e.g. in a table of related connections or in a connection state table) on the basis of the contents of the control connection. Since (all of) the attributes (e.g. ports) of the data connection are not known beforehand, a firewall rule allowing one specific data connection cannot be defined. Moreover, it is desirable to allow the data connection only for the time it is needed for legitimate use. One solution for this is to have a separate processing module, which monitors the FTP control connection, detects the attributes, which are negotiated for the data connection, and stores the details of the pending data connection in the firewall. An entry corresponding to the attributes may be added into a separate table of related connections or an entry may be added straight to the connection state table. Then, when the first packet of the FTP data connection arrives at the firewall, it is allowed on the basis of the entry already created by this separate processing module and no rules are needed for allowing the data connection.

It is possible, that such a separate module is produced by someone else than the party, who is administering the firewall. For example an MSP (Managed Service Provider) or an MSSP (Managed Security Service Provider) may offer firewall services to customers so that the firewall is administered by the MSP or MSSP and possibly internal networks of more than one customer are secured by one firewall. One such network configuration is shown in FIG. 1. An MSP offers firewall service for customers A and B. Thus, A and B connect their internal networks 100 and 102 to the Internet 104 via the firewall 106, which is administered by the MSP. The MSP manages the firewall 106 from its internal management network 108. In this kind of arrangement, the customers subscribe certain kind of protection from the MSP and the MSP provides the firewall with appropriate rules. However, customers may be assigned to administer a certain subset of firewall rules, which are specific to their network. Alternatively, the customers may not be able to (and they may not need to) modify the rules of the firewall.

Nevertheless, some customers may need to use some special protocols, which consist of more than one connection and require a separate processing module described above. Such special protocols are used especially in financial and banking sector. For increased security such protocols may further be unpublished and/or customer specific. In such situations the MSP may provide the customers possibility to design their own processing modules, called customer protocol agents herein.

This, however, creates a potential security risk. The customer protocol agent needs to have ability to add connections to the connection state table of the firewall in order to be able to provide the required functionality. The firewall administrator (e.g. the MSP), on the other hand, does not have possibility to limit the capability of the customer protocol agent to allow new connections as in principle the protocol agent could add any connection to the connection state table and, if a connection exists in the connection state table, it is allowed by default. Therefore, the customers may implement either accidentally or purposefully malicious protocol agents, which allow illegitimate connections through the firewall.

One solution for this problem is to include in the rule base special rules for related connections. In this case a related connection is added to the connection state table only if there is a rule, which allows such related connection. With this solution it is possible to allow or deny all related connection to some address/port. However, most often the need is to allow some legitimate related connections and to deny others. But it is impossible to know beforehand the exact details of these legitimate connections; e.g. the ports that related connections are using may vary over time and more than one protocol may use the same ports for related connections. Therefore this solution is insufficient and not flexible enough especially for MSP or MSSP use and a new solution is needed.

SUMMARY OF THE INVENTION

An object of the invention is to provide a new method, computer program product and firewall for handling data communication protocols comprising at least one parent connection and at least one related connection.

This object of the invention is achieved according to the invention as disclosed in the attached independent claims. Preferred embodiments of the invention are disclosed in the dependent claims. The features described in one dependent claim may be further combined with features described in another dependent claim to produce further embodiments of the invention.

The idea of the invention is to validate related connections on the basis of information related to the parent connection—i.e. on the basis of the connection within which opening the related connection is negotiated.

For example, after attributes of a related connection have been negotiated within a parent connection, these attributes are added into a new entry in a separate related connection table together with information about the parent connection or with a reference to an entry, where information about the parent connection is found. Then a special set of rules, which may be part of a normal rule base of the firewall or reside in an additional other rule base, is used for validating this entry. These rules indicate, whether the combination of the related connection and the parent connection is allowable. In other words, it is checked, if the parent connection is authorized to open such related connection. If the related connection is allowable, an entry corresponding to the connection is added to the connection state table of the firewall for allowing the related connection to traverse the firewall. This may be done right after negotiation of the attributes of the related connection, or when a first data packet belonging to the related connection is received at the firewall.

Alternatively, the entry comprising attributes of the related connection and information about the parent connection mentioned above may be made directly to the connection state table and validated when the first data packet of the related connection is received. In this case the entry needs to be marked as an entry concerning a related connection either explicitly or implicitly (e.g. by simply including information about the parent connection, which information does not appear in "normal" entries of the connection state table).

The connection state table in this context is to be understood as any kind of abstract data structure, which may be implemented in any suitable way.

The information about the parent connection may be e.g. one or many of the following: information about the source and the destination of the parent connection (e.g. a source address, a destination address, a source port and/or a destination port), used protocol (e.g. a protocol number), a user identifier, authentication information, a stream type -identifier, a program identifier, and information identifying a separate processing module (a protocol agent), which handles the parent connection. The separate processing module may be implemented by means of software, hardware or a combination of software and hardware. The attributes of a related connection, which are negotiated within the parent connection, typically include one or many of the following: a source address, a destination address, a source port, a destination port, used protocol (e.g. a protocol number), a user identifier, authentication information, a stream type -identifier, and a program identifier.

The invention provides a method of handling in a firewall data communication protocols comprising at least one parent connection and at least one related connection, wherein at least one attribute of the related connection is negotiated within the parent connection. The method comprises the steps of allowing a parent connection, storing information about the parent connection, monitoring contents of the parent connection, detecting within the parent connection negotiation of at least one attribute of a related connection, and using said at least one negotiated attribute of the related connection and said information about the parent connection for deciding, whether said related connection is allowable.

Further the invention provides a method of handling in a firewall data communication protocols comprising at least one parent connection and at least one related connection, wherein at least one attribute of the related connection is negotiated within the parent connection. The method comprises the steps of allowing a parent connection, storing information about the parent connection, monitoring contents of the parent connection, detecting within the parent connection negotiation of at least one of attribute of a related connection, comparing said at least one negotiated attribute of the related connection and at least one piece of information about the parent connection to a set of rules for finding a matching rule, and deciding on the basis of said matching rule, whether said related connection is allowable.

Still further the invention provides a method of handling in a firewall data communication protocols comprising at least one parent connection and at least one related connection, wherein at least one attribute of the related connection is negotiated within the parent connection. The method comprises the steps of allowing a parent connection, storing a first entry comprising information about the parent connection, monitoring contents of the parent connection, detecting within the parent connection negotiation of at least one of attribute of a related connection, storing a second entry comprising said at least one negotiated attribute of the related connection and at least one piece of information about the parent connection of the first stored entry, comparing said second entry to a set of rules for finding a matching rule, and deciding on the basis of said matching rule, whether said related connection is allowable.

The at least one piece of information about the parent connection may be for example a reference to said first entry, in which case the step of comparing comprises comparing a combination of said second entry and first entry to the set of rules for finding the matching rule.

A rule of said set of rules mentioned above comprises at least one attribute of a related connection, information about a parent connection and an action to be taken for a related connection. The set of rules may be structured in any suitable way; it may be for example a list, a table or a tree of rules.

With the method of the invention it is possible verify that a related connection is being opened by a legitimate parent connection, which is very important especially in an MSP or MSSP environment. The invention enables allowing or denying specific related connections for a specific port or handling some specific related connections in special way. That is, very high granularity can be obtained in denying or allowing related connections. Consequently, the level of security can be increased.

One difference between prior art solutions and the invention is that in prior art a related connection is typically allowed or denied on the basis of information obtained from data packets of the related connection, but the invention teaches a method of using also information, which is obtained from data packets of the parent connection.

These and other features of the invention, as well as the advantages offered thereby, are described hereinafter with reference to embodiments illustrated in the accompanying drawings.

DETAILED DESCRIPTION OF THE PREFERRED EMBODIMENTS

A firewall is considered as a set of components forming a gateway between two or more networks, which have different security requirements. Physically a firewall is a device with appropriate software to do the tasks assigned to it. It can be a router, a personal computer (PC), or whatever that can be used for such purposes. The invention can be employed in any such firewall, and especially in a firewall where separate processing modules are used for handling data packets of some protocols. Furthermore, the invention is suitable for providing increased security in an environment, where more than one party is using the same firewall. For example, when an MSP (or an MSSP) provides firewall service for one or more clients for securing internal networks of the clients, the MSP can gain increased security for its own management network and consequently for the whole arrangement by means of the invention.

According to the invention related connections are validated on the basis of information related to the parent connection—i.e. on the basis of the connection within which opening the related connection is negotiated. In the following description, the invention is illustrated in connection with packet switched data communications. However, the invention is not meant to be restricted only to packet switched communications; instead, the method of the invention is equally suitable for circuit switched communications.

Figure 2:
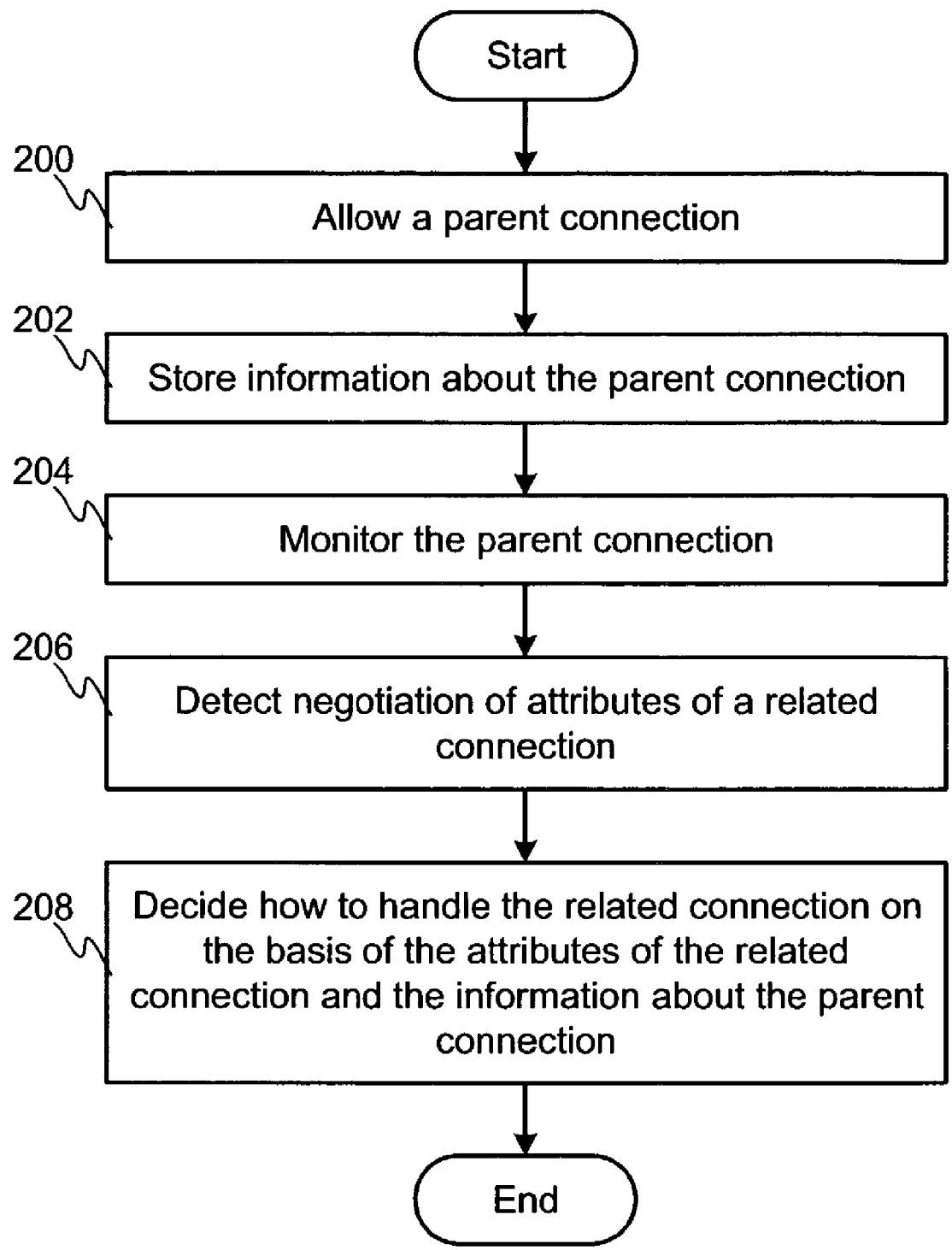
FIG. 2 is a flow chart illustrating an aspect of the method of the invention.

FIG. 2 is a flow chart illustrating one aspect of the invention. In step 200 a parent connection is first allowed. Allowing the parent connection is not addressed herein any further since it can be done e.g. on the basis of a firewall rule base, which is well known to anyone familiar with firewalls. Then information about the parent connection is stored in the firewall in step 202. Typically, in a stateful firewall an entry is made into a connection state table in order to allow following data packets of the parent connection to traverse the firewall and in order to maintain state of the parent connection.

The contents of the parent connection are monitored in step 204, which may be done for example by a separate processing module, such as a protocol agent. In step 206 negotiation of at least one attribute of a related connection is detected within the parent connection. Then, in step 208 the attributes of the related connection and said information about the parent connection are together used for deciding, whether said related connection is allowable.

The information about the parent connection may be e.g. one or many of the following: information about the source and the destination of the parent connection (e.g. a source address, a destination address, a source port and/or a destination port), used protocol (e.g. a protocol number), a user identifier, authentication information, a stream type -identifier, a program identifier, and information identifying a separate processing module (a protocol agent), which handles the parent connection. The separate processing module may be implemented by means of software, hardware or a combination of software and hardware. The attributes of a related connection, which are negotiated within the parent connection, typically include one or many of the following: a source address, a destination address, a source port, a destination port, used protocol (e.g. a protocol number), a user identifier, authentication information, a stream type -identifier, and a program identifier.

Figure 3:
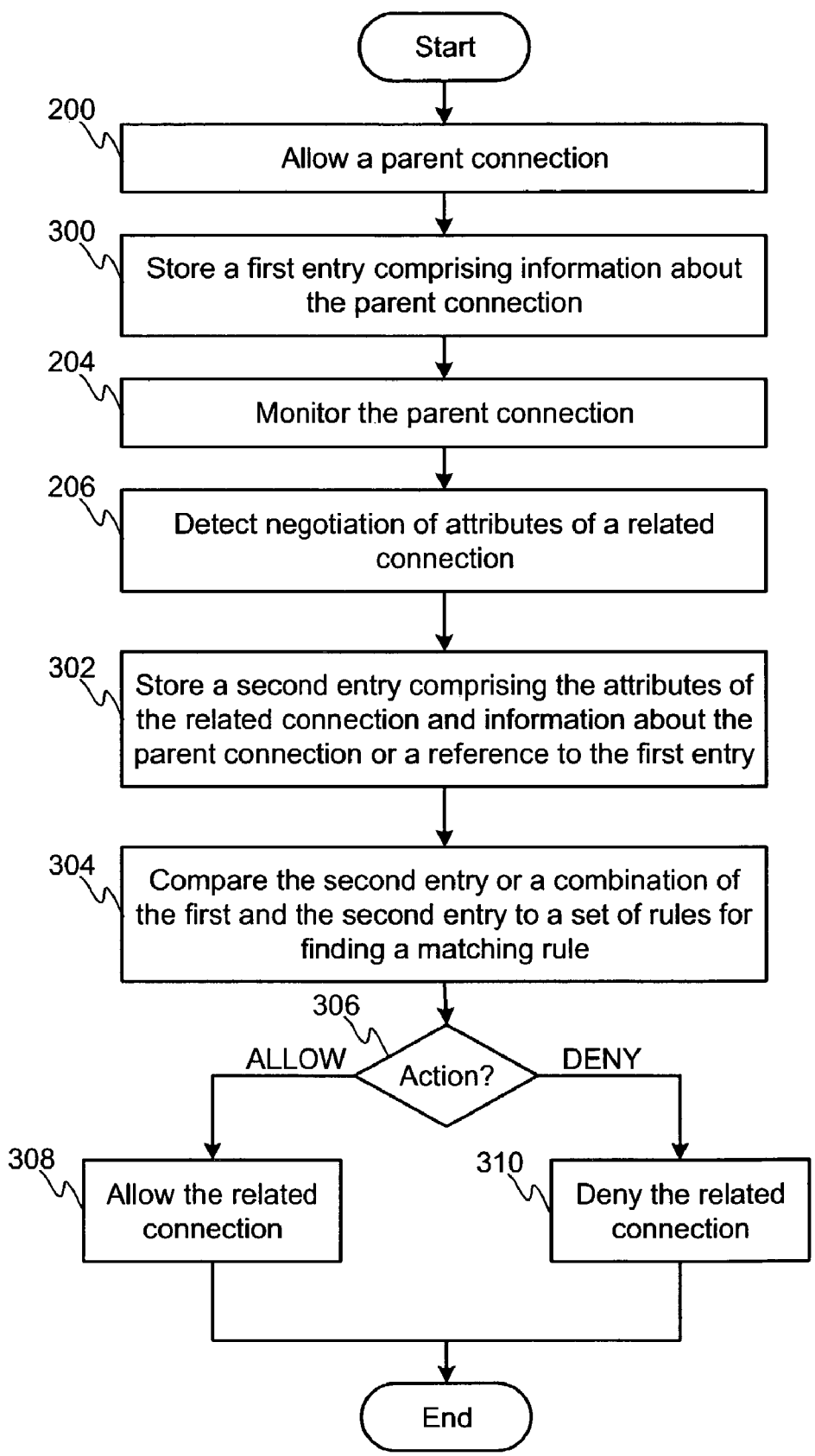
FIG. 3 is a flow chart illustrating other aspects of the method of the invention.

FIG. 3 is a flow diagram illustrating some other aspects of the invention. The steps, which are identical to the steps of FIG. 2, are herein referred to with equal reference numbers. In step 200 a parent connection is first allowed. Then information about the parent connection is stored in a first entry in the firewall in step 300. This entry is often made to a connection state table.

The contents of the parent connection are monitored and negotiation of at least one attribute of a related connection is detected within the parent connection in steps 204 and 206 respectively. Then, in step 302, a second entry comprising the attributes of the related connection and information about the parent connection or a reference to the first entry is stored. That is, an entry with the attributes of the related connection and either with information about the associated parent connection or with a reference to this information is stored. This second entry may be made into an additional connection table set up for related connections. Alternatively, the second entry may be made directly into the connection state table of the firewall or maintained in the firewall in some other way.

In step 304, the second entry or a combination of the first and the second entry is compared to a set of rules for finding a matching rule. In other words, information about the related connection and associated parent connection are compared to the set of rules. The rules indicate whether the combination of the related connection and the parent connection is allowable, that is, whether the parent connection is authorized to open such a related connection. For this purpose, a rule of the set of rules comprises at least one attribute of a related connection, information about a parent connection and an action to be taken for a related connection.

Thus, the action of the matching rule indicates how the related connection needs to be handled, step 306. If the action is allow the related connection is allowed, step 308. Similarly, if the action is deny the related connection is denied, step 310. As was stated above either of these actions may comprise further processing of the connection as well. However, such further processing is not addresses herein any further for the sake of clarity. Allowing the related connection usually means adding an entry corresponding to the related connection into the connection state table of the firewall.

The step 304 and the steps following it may be done right after the negotiation of the addressing details of the related connection, or when a first data packet belonging to the related connection is received at the firewall. The set of rules used for validating related connections may be part of the normal rule base of the firewall or of an additional other rule base, which is set up for the purpose of validating the related connections, or given in some other suitable structure.

If the second entry is made directly to the connection state table, it is validated when the first data packet of the related connection is received. In this case the entry is marked as an entry concerning a related connection and requiring validation either explicitly or implicitly (which is achieved e.g. by simply including information about the parent connection, which information does not appear in "normal" entries of the connection state table).

Figure 1:
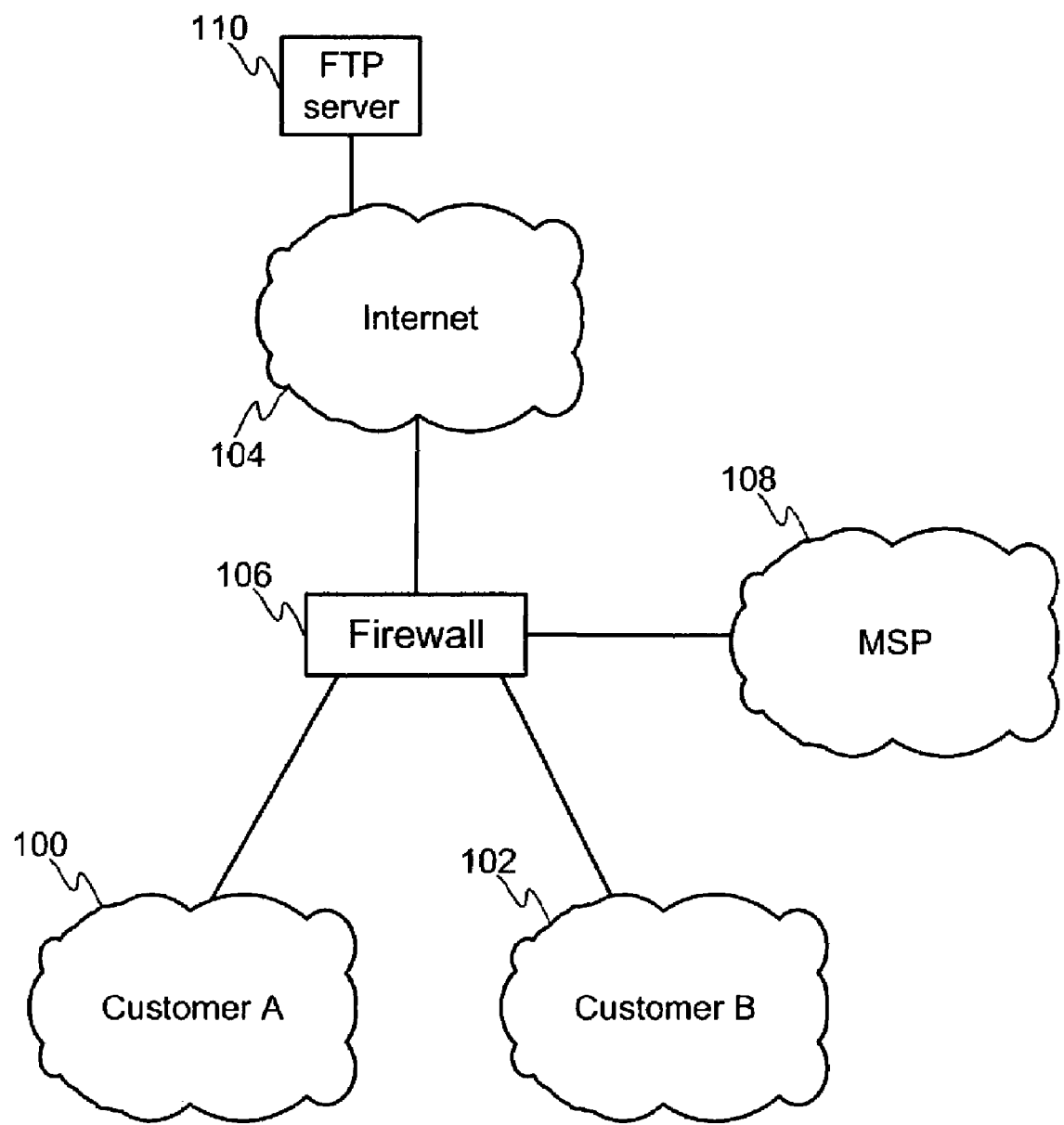
FIG. 1 illustrates an example network configuration.
Figure 4:
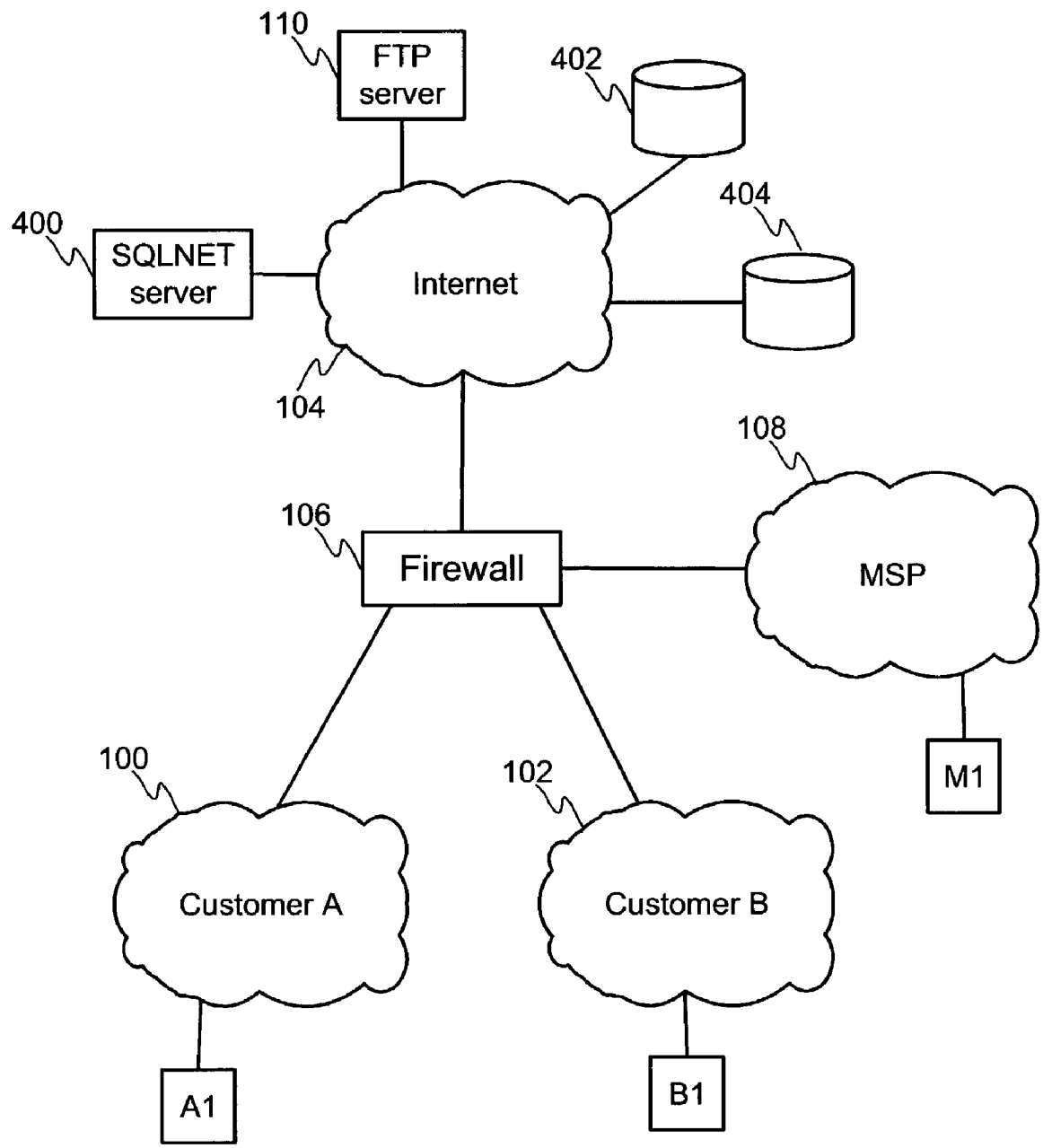
FIG. 4 illustrates another example network configuration.

FIG. 4 shows an example network configuration wherein the invention may be employed. In the same way as in FIG. 1, an MSP offers firewall service for customers A and B, who connect their internal networks 100 and 102 to the Internet 104 via the firewall 106, which is administered by the MSP. The MSP manages the firewall 106 from its internal network 108 (the MSP has also a connection to the Internet via this firewall). As was explained above, the customers A and B subscribe certain kind of protection from the MSP and the MSP provides the firewall 106 with appropriate rules.

Customers may be assigned to administer a certain subset of firewall rules, which are specific to their network, but the firewall as a whole is administered by the MSP. Alternatively, the customers may not be able to (and they may not need to) modify the rules of the firewall.

The invention is now illustrated in more detail by means of a simple example in connection with FIG. 4. The following notation is herein used for a connection (source host, source port, destination host, destination port). Let's assume the following rule base, which allows FTP connections from customer B's network 102 to the Internet 104 and denies all other connections. In addition, a protocol agent PA1 is to be used for the FTP connections.

| rule # | src addr | dst addr | Protocol | Agent | action |
|---|---|---|---|---|---|
| 1 | B | Internet | FTP | PA1 | allow |
| 2 | ANY | ANY | ANY | — | deny |

In legitimate use a host B1 in customer B's network opens an FTP control connection to an FTP server 110 in the Internet 104. This is allowed by the rule number 1, and the following entry, which allows forthcoming TCP data packets between port SP of host B1 and port FTPC of server S, is added to the connection state table:

| entry # | src addr | src port | dst addr | Dst port | protocol | agent |
|---|---|---|---|---|---|---|
| 1 | B1 | SP | S | FTPC | TCP | PA1 |

Then a PORT-command defining source and destination addresses and ports of the data connection (B1, DP, S, FTPD) is transmitted within the control connection. The protocol agent PA1 detects this and adds the entry number 2 to the connection state table. This entry allows TCP data packets between port FTPD of server S and port DP of host B1, i.e. the requested FTP data connection.

| entry # | src addr | src port | dst addr | dst port | protocol | agent |
|---|---|---|---|---|---|---|
| 1 | B1 | SP | S | FTPC | TCP | PA1 |
| 2 | S | FTPD | B1 | DP | TCP | — |

One example of illegitimate use is to open FTP control connection normally, and then to send a PORT-command defining following source and destination addressing information: (A1, DPA, S, FTPD). If validity of the addressing information is not verified in the protocol agent, entry 2' will be added to the connection state table and an illegitimate connection between port FTPD of server S and port DPA of host A1 will be allowed.

| entry # | src addr | src port | dst addr | dst port | protocol | agent |
|---|---|---|---|---|---|---|
| 1 | B1 | SP | S | FTPC | TCP | PA1 |
| 2' | S | FTPD | A1 | DPA | TCP | — |

It is possible, that an error in the protocol agent causes the addition of such illegitimate entry, that is, the protocol agent module alters the addressing information of the negotiated related connection by mistake. In this way, the customer B can cause security risks for customer A even unintentionally. Naturally the behaviour of the protocol agent may be also intentional.

This weakness of the system can be exploited in many other ways as well. Examples of other protocols, which require a protocol agent, which is able to allow related connections, are H.323, SQLNET and plurality of proprietary or user specific protocols.

In the method according to the invention, the control connection is first handled in normal way. When the PORT-command (A1, DPA, S, FTPD) is received and the protocol agent offers the corresponding entry 2' to be added to the connection state table, the new entry is checked against parent information and specific rules. Following simple rules are used for this:

| related rule # | src addr | dst addr | parent | action |
|---|---|---|---|---|
| 1 | Internet | B | src addr = B, agent = PA1 | allow |
| 2 | ANY | ANY | — | deny |

Now the related connection does not match the related rule number 1 and therefore the related connection should be denied. Thus the entry 2' is not added to the connection state table.

Alternatively, the entry 2' can be added to the connection state table with an addition of an indicator that this is a related connection and information about the parent connection. Information about the parent connection may be for example a link to the connection state table entry of the corresponding parent connection. Then, if a received data packet matches the entry 2', legitimacy of the connection is checked on the basis of the related rules above.

Clearly, the set of rules above is not a realistic one, since in reality more than one kind of related connections would be allowed. A set of rules, which denies some types of related connections and allows all others, is more likely to be a usable choice, but the example above clearly illustrates the principle of the invention.

When a new protocol agent is added to the firewall, a new related rule usually needs to be added as well. For example, if customer A of FIG. 1 would implement customer protocol agent PA2, an entry 1.5 may be added to the related rules:

| related rule # | src addr | dst addr | parent | action |
|---|---|---|---|---|
| 1 | Internet | B | src addr = B, agent = PA1 | allow |
| 1.5 | S | A | src addr = A1, agent = PA2 | allow |
| 2 | ANY | ANY | — | deny |

Now, related connections only between server S and network A are allowed and additionally, the parent connection needs to be initiated by the host A1.

Let's now consider another example in connection with Oracle SQL*Net-protocol. The client B of FIG. 4 may have a need to communicate with an SQL*Net listener process in a server 400400 and a plurality of Oracle databases 402, 404 located elsewhere in Internet. The host B1 in the internal network contacts the SQL*Net listener and requests some data. The SQL*Net listener may respond for example that the data is found in Oracle database 404, port 3000. On the basis of this the firewall needs to allow related connection between any port of host B1 and Oracle database 404, port 3000.

Since the client B probably has control over the SQL*Net listener process in the server 400, B can adapt the listener to respond to a request from host B1 in a specific way. It may respond for example, that the data is found from host M1, port X, which M1 is in MSP's internal network 108. Now the firewall 106 would try to allow B1 to connect to the internal network of the MSP. If protocols using related connections need to be enabled in the host M1, the MSP cannot avoid this with traditional means. However, by means of the invention this can be avoided. The MSP can for example allow related connections to or from its internal network only, if the associated parent connection is from its internal network as well, and to deny all other related connections to or from its internal network.

In order for the above exploit to be realistic, B must obviously find out that there is a host M1 to attack in the MSP's network. However, this is not considered herein any further, since the aim herein is not to enable but to avoid such exploit.

It is clear to a man skilled in the art that also various other kinds of restrictions can be created by means of the related rules. Further-more, it needs to be understood that the network configuration of FIG. 4 and the usage scenarios of the invention described above are only examples and that the invention can be employed in various other ways within the scope and spirit of the invention as defined in the appended claims.

The invention claimed is:

1. A method of handling in a firewall data communication protocols comprising at least one parent connection and at least one related connection, wherein at least one attribute of the at least one related connection is negotiated within the at least one parent connection, said method comprising
    allowing a parent connection,
    storing information about the parent connection,
    monitoring contents of the parent connection,
    detecting within the parent connection negotiation of at least one attribute of a related connection, and after said detecting
    i) comparing said at least one negotiated attribute of the related connection and at least one piece of said information about the parent connection to a set of rules for finding a matching rule, and deciding on the basis of said matching rule, whether the related connection is allowable,
    ii) allowing the related connection to pass through a firewall if the related connection is allowable, and
    iii) preventing the related connection from passing through the firewall if the related connection is not allowable, and
    wherein said information about the parent connection comprises at least one of the following: a source address, a destination address, a source port, a destination port, a user identifier, authentication information, a stream type identifier, a program identifier, and information identifying a separate processing module used for handling the parent connection, and wherein a rule of said set of rules comprises at least one attribute of a related connection, information about a parent connection and an action to be taken for a related connection.

2. The method of claim 1, wherein said at least one attribute of a related connection is a source address, a destination address, a source port, a destination port, used protocol, a user identifier, authentication information, a stream type identifier, or a program identifier.

3. A method of handling in a firewall data communication protocols comprising at least one parent connection and at least one related connection, wherein at least one attribute of the at least one related connection is negotiated within the at least one parent connection, said method comprising
    allowing a parent connection,
    storing information about the parent connection in a first entry,
    monitoring contents of the parent connection,
    detecting within the parent connection negotiation of at least one attribute of a related connection,
    storing a second entry comprising at least one negotiated attribute of the related connection and at least one piece of information about the parent connection of the first stored entry,
    comparing said second entry to a set of rules for finding a matching rule,
    deciding on the basis of said matching rule, whether the related connection is allowable,
    allowing the related connection to pass through a firewall if the related connection is allowable, and
    preventing the related connection from passing through the firewall if the related connection is not allowable,
    wherein said information about the parent connection comprises at least one of the following: a source address, a destination address, a source port, a destination port, a user identifier, authentication information, a stream type identifier, a program identifier, and information identifying a separate processing module used for handling the parent connection, and
    wherein a rule of said set of rules comprises at least one attribute of a related connection, information about a parent connection and an action to be taken for a related connection.

4. The method of claim 3, wherein said at least one piece of information about the parent connection in the second entry is a reference to the first entry, and wherein the step of comparing comprises comparing a combination of said second entry and first entry to the set of rules for finding said matching rule.

5. A computer program product comprising a computer readable medium which contains computer program code which, when executed in a computer device, provides a routine of handling data communication protocols comprising at least one parent connection and at least one related connection, wherein at least one attribute of the at least one related connection is negotiated within the at least one parent connection, said routine comprising allowing a parent connection, storing information about the parent connection, monitoring contents of the parent connection, detecting within the parent connection negotiation of at least one attribute of a related connection, and after said detecting i) comparing said at least one negotiated attribute of the related connection and at least one piece of said information about the parent connection to a set of rules for finding a matching rule, and deciding on the basis of said matching rule, whether the related connection is allowable, ii) allowing the related connection to pass through a firewall if the related connection is allowable, and iii) preventing the related connection from passing through the firewall if the related connection is not allowable, and wherein said information about the parent connection comprises at least one of the following: a source address, a destination address, a source port, a destination port, a user identifier, authentication information, a stream type identifier, a program identifier, and information identifying a separate processing module used for handling the parent connection, and wherein a rule of said set of rules comprises at least one attribute of a related connection, information about a parent connection and an action to be taken for a related connection.

6. The computer program product of claim 5, wherein said at least one attribute of a related connection is a source address, a destination address, a source port, a destination port, used protocol, a user identifier, authentication information, a stream type identifier, or a program identifier.

7. A computer program product comprising a computer readable medium which contains computer program code which, when executed in a computer device, provides a routine of handling data communication protocols comprising at least one parent connection and at least one related connection, wherein at least one attribute of the at least one related connection is negotiated within the at least one parent connection, said routine comprising allowing a parent connection, storing information about the parent connection in a first entry, monitoring contents of the parent connection, detecting within the parent connection negotiation of at least one attribute of a related connection, storing a second entry comprising said at least one negotiated attribute of the related connection comparing said second entry to a set of rules for finding a matching rule to determine whether the related connection is allowable allowing the related connection to pass through a firewall, if the related connection is allowable, and preventing the related connection from passing through the firewall, if the related connection is not allowable, wherein said information about the parent connection comprises at least one of the following: a source address, a destination address, a source port, a destination port, a user identifier, authentication information, a stream type-identifier, a program identifier, and information identifying a separate processing module used for handling parent connection, and wherein a rule of said set of rules comprises at least one attribute of a related connection, information about a parent connection and an action to be taken for a related connection.

8. The computer program product of claim 7, wherein said at least one piece of information about the parent connection in the second entry is a reference to said first entry, and in that the comparing comprises comparing a combination of said second entry and first entry to the set of rules for finding said matching rule.

9. A firewall device for handling data communication protocols comprising at least one parent connection and at least one related connection, wherein at least one of the addressing details of the at least one related connection is negotiated within the at least one parent connection, said firewall device comprising a computing unit, a computer readable medium containing computer program code executed in the computing unit, a mechanism for allowing a parent connection, a memory for storing a set of rules, a memory for storing information about the parent connection, a mechanism for monitoring contents of the parent connection, a mechanism for detecting within the parent connection negotiation of at least one attribute of a related connection, a mechanism, responsive to said detecting mechanism, for comparing said at least one negotiated attribute of the related connection and at least one piece of said information about the parent connection to said set of rules for finding a matching rule, and a mechanism for deciding on the basis of said matching rule, whether the related connection is allowable, a mechanism, responsive to said deciding, for allowing the related connection to pass through a firewall if the related connection is allowable, and a mechanism, responsive to said deciding, for preventing the related connection from passing through the firewall if the related connection is not allowable, and wherein said information about the parent connection comprises at least one of the following: a source address, a destination address, a source port, a destination port, used protocol, a user identifier, authentication information, a stream type identifier, a program identifier, and information identifying a separate processing module used for handling the parent connection, and wherein a rule of said set of rules comprises at least one attribute of a related connection, information about a parent connection and an action to be taken for a related connection.

10. The firewall device of claim 9, wherein said at least one attribute of a related connection is a source address, a destination address, a source port, a destination port, used protocol, a user identifier, authentication information, a stream type identifier, or a program identifier.

* * * * *